United States Patent
Abeeluck et al.

(10) Patent No.: US 6,836,606 B2
(45) Date of Patent: Dec. 28, 2004

(54) FILLED-CORE OPTICAL FIBER AND METHOD OF MAKING THE SAME

(75) Inventors: Akheelesh Abeeluck, Somerset, NJ (US); Benjamin Eggleton, Summit, NJ (US); Clifford Headley, Flemington, NJ (US); Abds-Sami Malik, Somerset, NJ (US); Stephan Wielandy, Hillsborough, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 163 days.

(21) Appl. No.: 10/342,793

(22) Filed: Jan. 15, 2003

(65) Prior Publication Data

US 2004/0136670 A1 Jul. 15, 2004

(51) Int. Cl.⁷ .................................. G02B 6/20
(52) U.S. Cl. .................... 385/125; 385/124; 385/127
(58) Field of Search ................................ 385/123, 125

(56) References Cited

U.S. PATENT DOCUMENTS

| | | | |
|---|---|---|---|
| 4,201,446 A | | 5/1980 | Geddes et al. |
| 4,354,735 A | | 10/1982 | Stowe et al. |
| 4,437,761 A | | 3/1984 | Kroger et al. |
| 4,747,662 A | | 5/1988 | Fitz |
| 5,221,308 A | * | 6/1993 | Krohn et al. .......... 65/393 |
| 5,493,629 A | | 2/1996 | Stange |
| 5,528,367 A | | 6/1996 | Putnam et al. |
| 5,579,429 A | | 11/1996 | Naum |
| 5,589,101 A | | 12/1996 | Khoo |
| 5,673,341 A | | 9/1997 | Takesue et al. |
| 6,631,234 B1 | * | 10/2003 | Russell et al. .......... 385/125 |
| 2002/0106164 A1 | | 8/2002 | Sasaoka et al. |

FOREIGN PATENT DOCUMENTS

| | | | |
|---|---|---|---|
| DE | 3121135 A1 | * 12/1982 | .......... G02B/5/176 |
| EP | 1 255 137 A2 | 11/2002 | |
| EP | 1 255 137 A3 | 3/2004 | |
| GB | 63113406 | 5/1988 | |

OTHER PUBLICATIONS

Iam–Choon Khoo, Andres Diaz, Michael V. Wood Pao Hsu Chen, "Passive Optical Limiting of Picosecond–Nanosecond Laser Pulses Using Highly Nonlinear Organic Liquid Cored Fiber Array", IEEE Journal on Selected Topics in Quantum Electronics vol. 7, No. 5, Sep./Oct. 2001.

Guang S. He, Jayant D. Bhawalker, Chan F. Zhao, Chi–Kyun Park, Paras IV. Prasad, "Two–Photon–Pumped Cavity lasing in a dye–solution–filled hollow–Fiber system", Dec. 1, 1995/vol. 20, No. 23, Optics Letters.

Yoochan Jeong, Byungchoon Yang, Byoung Ho Lee, Hong Seok Seo, Sangsoo Choi, Kyunghwan Oh, "Electrically Controllable Long–Period Liquid Crystal Fiber Gratings" IEEE Photonics Technology Letters, vol. 12, No. 5, May 2000.

* cited by examiner

*Primary Examiner*—Rodney Bovernick
*Assistant Examiner*—Jennifer Doan
(74) *Attorney, Agent, or Firm*—Wendy W. Koba

(57) ABSTRACT

A filled-core optical fiber and method where the optical fiber is collapsed at opposing ends subsequent to the active optical material being introduced into the hollow core region. The collapsing-functions to "pinch off" the active material (which may be a liquid or solid) within the fiber structure and also collapse the cladding layer ring surrounding the core into a solid core region on either side of the active material. The filled-core fiber is then sealed and can be coupled to standard fiber using conventional splicing processes.

18 Claims, 2 Drawing Sheets

FILLED-CORE OPTICAL FIBER AND METHOD OF MAKING THE SAME

TECHNICAL FIELD

The present invention relates to a filled-core optical fiber structure and, more particularly, to a hollow core fiber filled with an optically active material and a method of making such a fiber so that it may be easily coupled to standard optical transmission fiber.

BACKGROUND OF THE INVENTION

Hollow-core optical fibers have become more prevalent in recent years as various uses for them have been developed. For example, a hollow-core optical fiber may be filled with a liquid crystal material and then used as an electrically-controllable long period fiber grating. See, for example, *Electrically Controllable Long-Period Liquid Crystal Fiber Gratings*, by Y. Jeong et al., appearing in IEEE Photonics Technology Letters, Vol. 12, No. 5, May 2000, at pp. 519 et seq. Such a fiber has the same essential structure as a common transmission fiber, with the exception of the core region being filled to contain the desired active material. In the arrangement described by Jeong et al., a liquid crystal core fiber was formed by filling a hollow core fiber with a nematic liquid crystal material using capillary action. Index matching between a silica core transmission fiber and the liquid crystal-filled fiber was achieved by using a low index nematic liquid crystal material between the two.

In another utilization of a hollow-core fiber, a two-photon pumped laser has been formed by using a hollow-core fiber that is filled with a particular dye material that causes lasing or superradiance behavior. See, for example, *Two-photon-pumped cavity lasing in a dye-solution-filled hollow-fiber system*", by G. S. He et al., appearing in Optical Letters, Vol. 20, No. 23, Dec. 1, 1995, at pp. 2393 et seq. In the particular lasing structure as discussed by He et al., the internal diameter of the hollow fiber was 100 μm and the two open ends of the fiber were immersed in two identical liquid coupling cells, each filled with the same dye solution as used in the core of the fiber. Each of the coupling cells further included an optical window to provide coupling out of the liquid-filled fiber and into the rest of the system.

Liquid-core optical fibers have also been used to measure temperature, as disclosed in U.S. Pat. No. 4,201,446 issued to Geddes et al. on May 6, 1980. In the Geddes et al. arrangement, a liquid-core fiber is disclosed in which the refractive index of the liquid core varies with temperature. Therefore, the temperature of the substance through which the liquid-core optical fiber passes can be measured from the maximum angle of the transmitted light output from the end of the fiber. The liquid-core fiber of Geddes et al. comprised a transparent capillary tube that was then filled with the temperature-sensitive liquid. The tube is then joined in series with conventional multimode fibers. There is no discussion in Geddes et al. regarding the degree of optical coupling that could be achieved with this approach, where the use of capillary tubes is known to cause reflections at the interface between the tube and the multimode fiber.

The ability to incorporate optically active materials (i.e., the optical properties of the materials can be altered by various means including the passage of an intense beam of light and the application of an external electric field) into hollow core fibers is of tremendous potential benefit. For instance, materials with high optical nonlinearities can be used to allow for more compact and lower power optical devices. It is asserted that the various prior art approaches to filling and sealing core-filled fibers are not practical for most optical system applications. In particular, the active core material is not sealed inside the fiber, which is a practical necessity for commercial device applications. Further, there is no known low-loss method for coupling light into and out of a core-filled optical fiber.

SUMMARY OF THE INVENTION

These and other problems remaining in the prior art are addressed by the present invention, which relates to a filled-core optical fiber structure and, more particularly to method of making such a structure that may be easily coupled to standard optical transmission fiber.

In accordance with the present invention, active core material is first introduced into a section of hollow core fiber, where the fiber is formed to comprise a high index cladding ring that surrounds the hollow core. The active core material may be, but is not limited to, a liquid that functions to alter the optical properties of a signal passing therethrough. Once the core is filled with a desired amount of active material, the end portions of the fiber (which do not contain the active material) are collapsed such that the high index cladding ring is compressed to form a high index core on either side of the core-filled fiber section, essentially "pinching" off and hermetically sealing the active material within the desired section of fiber.

In a preferred embodiment, the collapsing process is performed so that the final fiber structure includes opposing ends where the high index ring material forms high index core regions, followed by transition regions where the high index rings adiabatically taper outward to the central, core-filled fiber section. The adiabatic transition allows for low-loss mode evolution from the high index core region to the high index ring.

It is an aspect of the present invention that the collapsed fiber sections, including the high index core regions, can then easily be coupled (usually conventional techniques such as fusion splicing) to standard transmission fibers, thus forming a low-loss arrangement for coupling into and out of core-filled fibers. Moreover, the collapsed endpoints provide for a hermetic seal and ensure that the core material (in most cases, a liquid) remains in place within the core-filled fiber section.

Other and further aspects and benefits of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
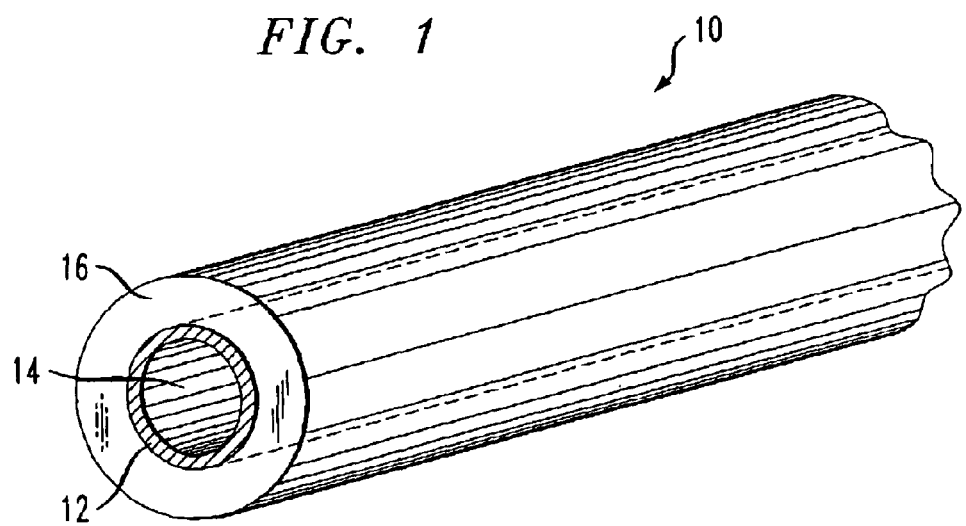
FIG. 1 contains an isometric view of an exemplary section of hollow-core optical fiber that may be filled with active material and sealed in accordance with the present invention.

FIG. 1 illustrates an exemplary section of hollow-core fiber 10 that may be processed to be filled with active core material and then sealed in accordance with the present invention. As shown, hollow-core fiber 10 comprises a high index cladding ring 12 that surrounds hollow core 14, where an outer cladding layer 16 is formed to enclose high index cladding ring 12. The outer cladding layer 16 has an index lower than that of the cladding ring 12. For example, a typical diameter of the hollow core 14 is 5 µm, a typical width of the high index cladding ring 12 is 4 µm, and a typical index difference between the high index cladding ring 12 and the outer cladding layer 16 is approximately 0.005. Various conventional materials, such as germanium-doped silica and silica may be used to form high index cladding ring 12 and outer cladding layer 16, respectively. It is to be understood that an exemplary hollow-core fiber may include other, similar geometries, and may include in particular additional cladding and outer protective layers. For the purposes of the present invention, the inclusion of hollow core 14 and high index cladding ring 12 are considered to be essential.

Figure 2:
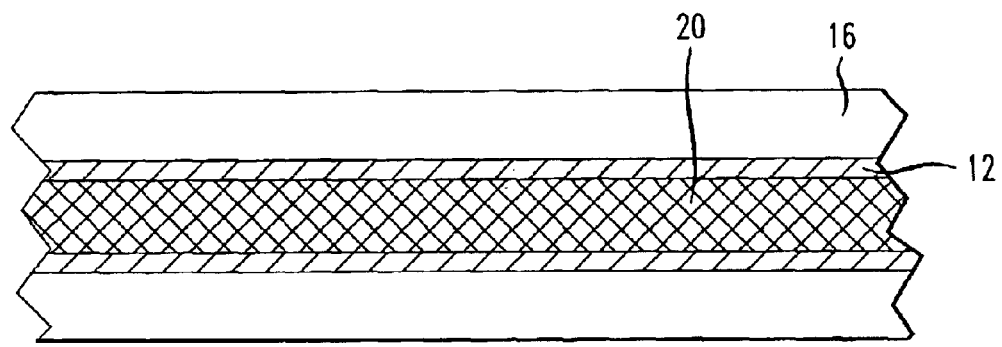
FIG. 2 illustrates, in a cut-away side view, the hollow-core fiber section of FIG. 1, as it is filled with an active core material, such as a liquid or solid.

FIG. 2 contains a cut-away side view of fiber 10 of FIG. 1 as it is filled in core 14 with an active material 20, for example a liquid, that is used to modify the optical parameters of the fiber. Material 20 may be introduced into fiber 10 using any suitable process, such as by using suction pressure or capillary action or by forcing the material into the hollow core using compressed air or an inert gas. Other suitable processes would be used to fill hollow core 14 with a solid material. The particular composition of material 20 is of no concern for the fabrication process of the present invention. Once material 20 has been introduced, fiber 10 is collapsed, in accordance with the present invention, to trap material 20 within fiber 10 and reduce the outer portions of high index cladding ring 12 to form solid core regions.

Figure 3:
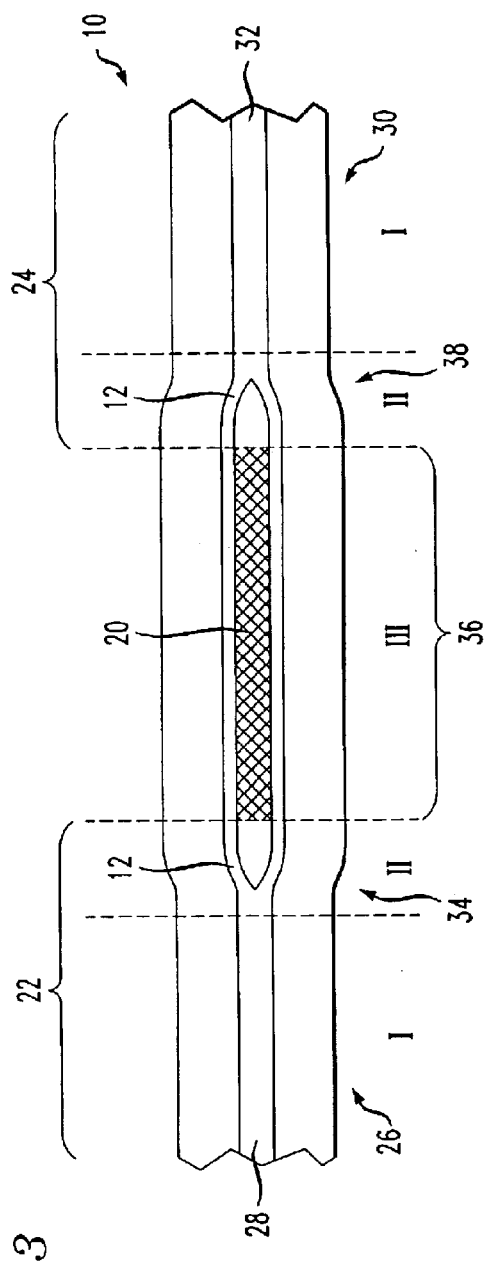
FIG. 3 illustrates the active core-filled fiber section of FIG. 2, subsequent to being collapsed to seal off the active core material and form high index end core regions.

FIG. 3 illustrates fiber 10 after this collapsing operation has been performed. A heat process may be used, applied to end sections 22 and 24 of fiber 10, to perform this function. In one exemplary process, a heat source, such as a tungsten filament, is moved along end sections 22 and 24 with a variable power so that fiber 10 is tapered down and collapsed on either side. As an example, the heat source is moved over a distance of 7 mm, with a maximum power of 20.5 W. As shown, the collapsing process results in forming a first end coupling section 26 where high index cladding ring 12 has been collapsed to form a first high index core region 28. In a similar manner, a second end coupling section 30 is formed, where high index cladding ring 12 is collapsed to form a second high index core region 32. In a preferred embodiment of the present invention, the collapsing process is performed to create an adiabatically tapered section 34 between first coupling section 26 and central region 36 of fiber 10, and a similar adiabatically tapered section 38 between second coupling section 30 and central region 36. These adiabatically tapered transition regions 34 and 38 may be partially filled with active material 20 and may also therefore contain a bubble of any gas that was present in the fiber during the collapse process. However, by controlling the collapsing process to create an adiabatic transition, the mode field of the light propagating in first high index core 28 will evolve with low loss as the signal propagates through regions 26 and 34 into central region 36. Similarly, the presence of an adiabatic taper in region 38 between central region 36 and second high index core 32 will effectively lead to low-loss mode evolution as the optical signal exits active material 20.

Figure 4:
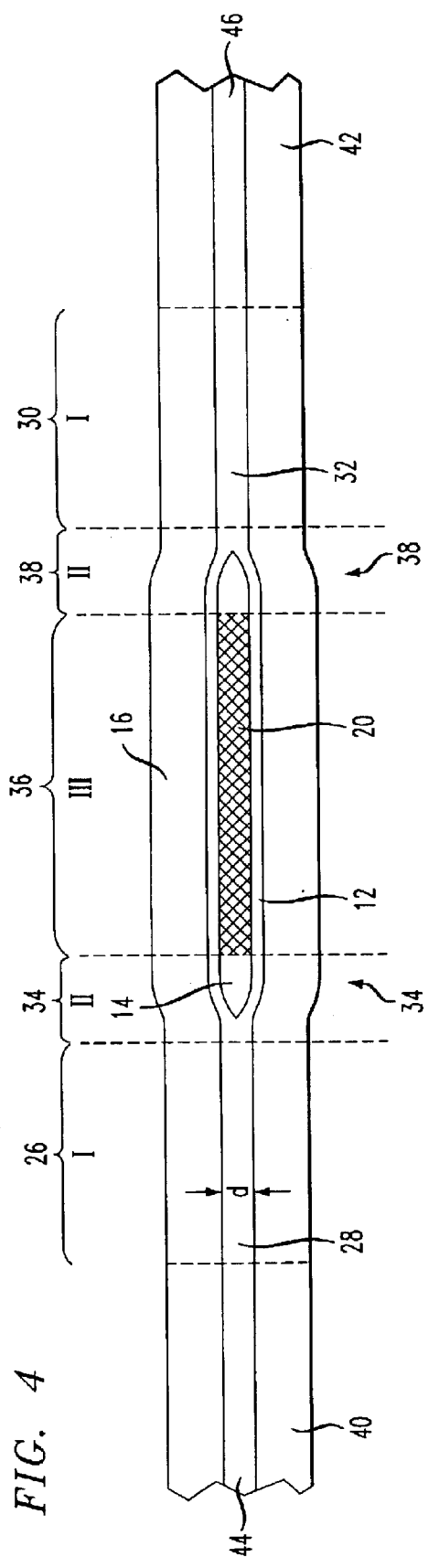
FIG. 4 illustrates the collapsed fiber section of FIG. 3 as it is attached to exemplary sections of conventional optical transmission fiber.

FIG. 4 illustrates the collapsed fiber section 10 of FIG. 3 as it is conventionally coupled to separate sections 40 and 42 of transmission fiber. Fusion splicing is an exemplary process, well known in the art, that may be used to join the fiber 10 to fiber sections 40 and 42 after cleaving fiber 10 to provide flat surfaces at either end. In a preferred embodiment of the present invention, the width of high index ring 12 is chosen so that when fiber 10 is collapsed the diameter of high index core regions 28 and 32 will essentially match core regions 44 and 46 of fibers 40 and 42, respectively. This matching thus provides relatively efficient, low loss coupling of the optical signal into and out of fiber device 10. Moreover, the resultant symmetry present in collapsed fiber section 10 ensures that low polarization dependence has been introduced in the signal as it propagates from first coupling region 26 through central region 36 and exits through second coupling region 30.

Two specific examples of the application of the hollow core fiber described above will be discussed. In the first example, a hollow core fiber with a highly nonlinear material sealed inside can serve as a compact optical switch where, in addition, a relatively low optical power level can be used for the switching operation. Such highly nonlinear materials include chalcogenides that have a nonlinear coefficient $n_2$, which is typically two to three orders of magnitude larger than that of silica. An optical phase shift is induced as a result of self-phase modulation when light propagates through the nonlinear material. This phase shift is defined by $\Delta\phi=(2\pi L/\lambda)n_2 I$, where L is the length of the fiber containing the nonlinear material, I is the optical intensity of the propagating light, and $\lambda$ is the wavelength. Because $n_2$ is much larger for chalcogenides than for silica, a $\pi$-phase shift can be induced using a combination of a shorter length of fiber and a lower power level, as seen from the above equation. An optical switch can be designed with the hollow core fiber containing the nonlinear material in a number of configurations, including a Mach-Zehnder interferometer and a Sagnac interferometer.

A second example involves a hollow core fiber containing an electrically-switchable material such as a liquid crystal. Such a device can be used, for instance, as a modulator. An electric field applied across the fiber core will produce a change in the refractive index of the material. By choosing a material with an index that changes from a value above that of cladding ring 12 to a lower value as the applied electric field changes in magnitude, the distribution of the optical field propagating in the fiber changes from being predominantly in the filled core to cladding ring 12. If the absorption coefficients of the filling material and cladding ring 12 are different, the optical field will thus be attenuated to different extents, depending on the applied electric field.

It is to be understood that although the characteristics and advantages of the present invention have been set forth in the foregoing description, the disclosure is illustrative only, and changes may be made in both the device and method of making the device while remaining within the scope of the claims appended hereto.

What is claimed is:

1. A filled-core optical fiber comprising
    a central section including a core region filled with optically active material and a high refractive index cladding ring surrounding said core region, said central section defined as having a first end termination and a second, opposing end termination;
    a first coupling region coupled to the central section first end termination, said first coupling region including a core area comprising a collapsed section of said high refractive index cladding ring; and a second coupling region coupled to the central section second, opposing end termination, said second coupling region including a core area comprising a collapsed section of said high refractive index cladding ring.

2. A filled-core optical fiber as defined in claim 1 wherein the optically active material comprises a liquid material.

3. A filled-core optical fiber as defined in claim 1 wherein the optically active material comprises a liquid crystal material.

4. A filled-core optical fiber as defined in claim 1 wherein the optically active material comprises chalcogenide.

5. A filled-core optical fiber as defined in claim 1 wherein the optically active material comprises a solid material.

6. A filled-core optical fiber as defined in claim 1 wherein the fiber further comprises a first transition region disposed between the first coupling region and the central region, said first transition region including an outward taper coupling the high index core area of said first coupling region to said high refractive index cladding ring; and a second transition region disposed between said central region and the second coupling region, said second transition region including an inward taper coupling said high refractive index cladding ring to said high refractive index core area of the second coupling region.

7. A filled-core optical fiber as defined in claim 6 wherein the inward and outward tapers comprise adiabatic tapers so as to maintain an essentially low-loss mode evolution across each transition region.

8. An optical communication system comprising a communication fiber including a core area having a defined diameter; and a filled-core optical fiber including a central section including a core region filled with optically active material and a high refractive index cladding ring surrounding said core region, said central section defined as having a first end termination and a second, opposing end termination;

a first coupling region coupled to the central section first end termination, said first coupling region including a core area comprising a collapsed section of said high refractive index cladding ring; and a second coupling region coupled to the central section second, opposing end termination, said second coupling region including a core area comprising a collapsed section of said high refractive index cladding ring, wherein the communication fiber is coupled to the first coupling region so as to align the communication fiber core area with the high refractive index core area of said first coupling region.

9. An optical communication system as defined in claim 8 wherein the first coupling region core area comprises a diameter essentially equal to the communication fiber core area.

10. An optical communication system as defined in claim 8 wherein the optically active material in the central section comprises a liquid material.

11. An optical communication system as defined in claim 8 wherein the optically active material in the central section comprises a liquid crystal.

12. An optical communication system as defined in claim 8 wherein the optically active material in the central section comprises chalcogenide.

13. An optical communication system as defined in claim 8 wherein the optically active material in the central section comprises a solid material.

14. An optical communication system as defined in claim 8 wherein the system further comprises a second communication fiber including a core area having a defined diameter, the second communication fiber coupled to the second coupling region so as to align the second communication fiber core area with the high refractive index core area of said second coupling region.

15. An optical communication system as defined in claim 14 wherein the second coupling region core area comprises a diameter essentially equal to the second communication fiber core area.

16. A method of making a filled-core optical fiber, the method comprising the steps of:

providing a section of hollow-core fiber, said hollow-core fiber defined as having a first end termination and a second, opposing end termination and including a high refractive index cladding ring surrounding a hollow core region;

filling a portion of said hollowing core region with an optically active material; and collapsing the first and second end terminations of said hollow-core fiber so as to encapsulate the optically active material and collapse the cladding ring at each end termination into a high refractive index solid core region.

17. The method as defined in claim 16 wherein in performing the collapsing step, the filled-core optical fiber is collapsed to form a first transition region between the solid core region at the first end termination and the cladding layer and a second transition region between the cladding layer and the solid core region at the second end termination.

18. The method as defined in claim 16 wherein the first and second transition regions comprise adiabatic transition regions.

* * * * *